US009495326B2

United States Patent
Purkayastha et al.

(10) Patent No.: US 9,495,326 B2
(45) Date of Patent: Nov. 15, 2016

(54) PROVIDING COMMUNICATION PATH INFORMATION IN A HYBRID COMMUNICATION NETWORK

(75) Inventors: Punyaslok Purkayastha, San Diego, CA (US); Sai Yiu Duncan Ho, San Diego, CA (US); Bibhu Prasad Mohanty, San Diego, CA (US); Etan Gur Cohen, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 164 days.

(21) Appl. No.: 13/610,846

(22) Filed: Sep. 11, 2012

(65) Prior Publication Data

US 2013/0067056 A1  Mar. 14, 2013

Related U.S. Application Data

(60) Provisional application No. 61/533,505, filed on Sep. 12, 2011.

(51) Int. Cl.
| | | |
|---|---|---|
| G06F 15/173 | (2006.01) | |
| H04W 40/24 | (2009.01) | |
| H04L 12/751 | (2013.01) | |
| H04L 12/759 | (2013.01) | |

(52) U.S. Cl.
CPC ....... *G06F 15/17306* (2013.01); *H04L 45/025* (2013.01); *H04L 45/028* (2013.01); *H04W 40/248* (2013.01)

(58) Field of Classification Search
None
See application file for complete search history.

(56) References Cited

U.S. PATENT DOCUMENTS

| | | |
|---|---|---|
| 6,012,084 A | 1/2000 | Fielding et al. |
| 7,085,814 B1 | 8/2006 | Gandhi et al. |
| 7,366,113 B1 | 4/2008 | Chandra et al. |

(Continued)

FOREIGN PATENT DOCUMENTS

| | | |
|---|---|---|
| CN | 1866863 | 11/2006 |
| CN | 101155084 | 4/2008 |

(Continued)

OTHER PUBLICATIONS

Ahn Sanghyun et al., "Energy-Efficient Flooding Mechanisms for the Wireless Sensor Networks", International Conference on Information Networking (ICOIN), Jan. 23, 2008, pp. 1-5, IEEE, Piscataway, NJ, USA, XP031238818, ISBN: 978-89-960761-1-7.

(Continued)

*Primary Examiner* — Chris Parry
*Assistant Examiner* — Stephen Houlihan
(74) *Attorney, Agent, or Firm* — DeLizio Law, PLLC

(57) ABSTRACT

Providing communication path information in a mixed communication network. A first message may be provided from a first device to a second device. The first message may request notification of characteristics of at least one communication path between the second device and a third device. The first device, the second device, and the third device may be coupled together in a mixed communication network. Accordingly, the first device may receive at least one message from the second device regarding the characteristics of the at least one communication path between the second device and the third device.

31 Claims, 8 Drawing Sheets

(56) References Cited

U.S. PATENT DOCUMENTS

| | | | |
|---|---|---|---|
| 7,706,340 | B2 | 4/2010 | Bronez |
| 7,843,921 | B2* | 11/2010 | Muhonen et al. ............ 370/392 |
| 7,961,674 | B2 | 6/2011 | Jing et al. |
| 8,099,764 | B2 | 1/2012 | Herzog et al. |
| 8,260,902 | B1 | 9/2012 | Degraaf et al. |
| 8,549,541 | B2 | 10/2013 | Moyer et al. |
| 2002/0152299 | A1 | 10/2002 | Traversat et al. |
| 2004/0010617 | A1* | 1/2004 | Akahane et al. ............. 709/243 |
| 2004/0022226 | A1 | 2/2004 | Edlund et al. |
| 2006/0168159 | A1 | 7/2006 | Weisman et al. |
| 2006/0230238 | A1* | 10/2006 | Roy et al. ..................... 711/141 |
| 2007/0010271 | A1* | 1/2007 | Roy ..................... H04W 24/00 |
| | | | 455/517 |
| 2007/0089055 | A1* | 4/2007 | Ko et al. ....................... 715/700 |
| 2007/0201459 | A1 | 8/2007 | Bao et al. |
| 2007/0208837 | A1 | 9/2007 | Tian et al. |
| 2008/0276004 | A1 | 11/2008 | Thomson et al. |
| 2009/0116404 | A1 | 5/2009 | Mahop et al. |
| 2009/0182868 | A1* | 7/2009 | McFate et al. ............... 709/224 |
| 2009/0225758 | A1 | 9/2009 | Morimoto et al. |
| 2010/0165884 | A1 | 7/2010 | Farkas et al. |
| 2010/0188971 | A1 | 7/2010 | Chiang |
| 2010/0232317 | A1 | 9/2010 | Jing et al. |
| 2010/0278184 | A1* | 11/2010 | Sailhan et al. ................ 370/400 |
| 2011/0099559 | A1 | 4/2011 | Kache et al. |
| 2011/0134797 | A1 | 6/2011 | Banks et al. |
| 2011/0206035 | A1 | 8/2011 | Lee et al. |
| 2012/0084413 | A1* | 4/2012 | Pasternak ..................... 709/221 |
| 2012/0099457 | A1 | 4/2012 | Roy |
| 2012/0158933 | A1 | 6/2012 | Shetty et al. |
| 2012/0176914 | A1 | 7/2012 | Choudhury |
| 2012/0203897 | A1 | 8/2012 | Mishra et al. |
| 2012/0236757 | A1 | 9/2012 | Klein |
| 2012/0320893 | A1 | 12/2012 | Jamadagni et al. |
| 2012/0320919 | A1* | 12/2012 | Baliga et al. ................. 370/392 |
| 2013/0250810 | A1 | 9/2013 | Ho |

FOREIGN PATENT DOCUMENTS

| | | |
|---|---|---|
| CN | 101228744 | 7/2008 |
| CN | 103765835 | 4/2014 |
| CN | 103828440 | 5/2014 |
| JP | 2003209577 | 7/2003 |
| JP | 2004512622 | 4/2004 |
| JP | 2004266519 | 9/2004 |
| JP | 2007114183 | 5/2007 |
| JP | 2007226805 | 9/2007 |
| JP | 2008046757 | 2/2008 |
| JP | 2008078935 | 4/2008 |
| JP | 2009512401 | 3/2009 |
| JP | 2009217836 | 9/2009 |
| JP | 2014529995 | 11/2014 |
| KR | 20080066621 | 7/2008 |
| KR | 20100006409 | 1/2010 |
| KR | 1020140049612 | 4/2014 |
| KR | 1020140059833 | 5/2014 |
| WO | 0158069 | 8/2001 |
| WO | 0235796 | 5/2002 |
| WO | 2006/138122 | 12/2006 |
| WO | 2008026256 | 3/2008 |
| WO | 2011102688 | 8/2011 |
| WO | 2013033457 | 3/2013 |
| WO | 2013040097 | 3/2013 |

OTHER PUBLICATIONS

International Search Report and Written Opinion—PCT/US2012/054948—ISA/EPO—Feb. 8, 2013.

"PCT Application No. PCT/US12/53222 International Search Report", Jan. 16, 2013, 14 pages.

International Preliminary Report on Patentability—PCT/US20121054948, The International Bureau of WIPO—Geneva, Switzerland, Sep. 17, 2013.

"PCT Application No. PCT/2012/053222 Written Opinion of the IPEA", Aug. 8, 2013, 8 pages.

PCT Application No. PCT/US2012/053222 International Preliminary Report on Patentability, 10 pages, Oct. 29, 2013.

Co-pending U.S. Appl. No. 13/599,715, filed Aug. 30, 2012, 44 pages.

"Standard for a Convergent Digital Home Network for Heterogeneous Technologies", IEEE P1905.1 Project Authorization Request (PAR). Available from IEEE, Nov. 8, 2010, 2 pages.

"U.S. Appl. No. 13/599,715 Office Action", Jul. 8, 2014, 29 Pages.

"Korean Patent Application No. 1020147008396, KIPO Notice of Grounds for Rejection", 10 pages, Oct. 27, 2014.

"Korean Patent Application No. 1020147009723, KIPO Notice of Grounds for Rejection", Nov. 21, 2014, 10 pages.

"U.S. Appl. No. 13/599,715 Final Office Action", Dec. 18, 2014, 26 pages.

"Japanese Patent Application No. 2014529995, Office Action", Jul. 28, 2015, 10 pages.

"Development of Terminal Information Gathering Mechanism for Ad Hoc Network Testbed", Feb. 28, 2008, 8 pages.

"Japanese Patent Application No. 2014528615 Office Action", Mar. 16, 2015, 9 pages.

"Korean Patent Application No. 1020147009723, KIPO Notice of Grounds for Rejection", Jul. 29, 2015, 9 pages.

"Performance Evaluation of Multiplexing Schemes for IP Packets in Digital Multimedia Broadcasting Systems", Oct. 1, 2010, 15 pages.

"European Patent Office Application No. 15186905.4, European Search Report", Dec. 7, 2015, 9 pages.

Sanghyun, et al., "Energy-Efficient Flooding Mechanisms for the Wireless Sensor Networks", Jan. 23, 2008, 5 pages.

"U.S. Appl. No. 13/599,715 Office Action", Oct. 21, 2015, 28 pages.

"Japanese Patent Application No. EP15182899.3, European Search Report", Nov. 30, 20155, 7 pages.

"Korean Patent Application No. 1020147009723, KIPO Notice of Grounds for Rejection", Jan. 22, 2016, 7 pages.

* cited by examiner

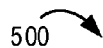

| Field | Length | Value | Description |
|---|---|---|---|
| TLV Type | 1 octet | 10 | Link Metric Subscription Request |
| TLV Length | 1 octet | 11+7×n | # octets in ensuing field |
| TLV Value | 6 octets | | Neighbor device MAC ID |
| | 2 octets | | Subscription identifier |
| | 3 octets | | The requested duration (in seconds) of the subscription; a value of zero cancels a subscription |
| | | | The following fields shall be repeated for each interface of the neighbor device |
| | 6 octets | | Interface-specific MAC ID of the local interface |
| | 2 bits | | '00': No information needed<br>'01': Periodic<br>'10': Event-triggered<br>'11': Periodic and Event-triggered |
| | 6 bits | | Reserved. Currently set to all 0's. |

| Field | Length | Value | Description |
|---|---|---|---|
| TLV Type | 1 octet | 11 | Link Metric Information of Neighbor Device |
| TLV Length | 1 octet | 11+13×n | # octets in ensuing field |
| TLV Value | 6 octets | | Neighbor device MAC ID |
| | 2 octets | | Subscription identifier |
| | 3 octets | | The remaining duration (in seconds) of the subscription; a value of zero cancels a subscription |
| | | | The following fields shall be repeated for each interface of the neighbor device |
| | 6 octets | | Interface-specific MAC ID of the local interface |
| | 2 bits | | '00': No information requested<br>'01': Periodic<br>'10': Event-triggered<br>'11': Periodic and Event-triggered |
| | 6 bits | | Reserved. Currently set to all 0's. |
| | 3 octets | | Goodput (an integer value) in Mbps as measured over the interface |
| | 3 octets | | Medium utilization (an integer value) in percentage as measured over the interface |

FIG. 6

PROVIDING COMMUNICATION PATH INFORMATION IN A HYBRID COMMUNICATION NETWORK

CROSS-REFERENCE TO RELATED APPLICATIONS

This application claims the priority benefit of U.S. Provisional Application Ser. No. 61/533,505, filed Sep. 12, 2011.

BACKGROUND

The present disclosure generally relates to the field of communication systems, and more particularly to a system and method for providing communication path information in a mixed communication network.

In recent years, devices and communication protocols have become more and more prevalent. For example, users often have multiple different devices supporting multiple different communication protocols. Devices may generally support a single communication protocol or a plurality of different communication protocols, such as Ethernet, 802.11, Bluetooth, powerline communication (PLC), multimedia over coaxial (MoCA), IEEE 1901, etc. Additionally, new and improved communication protocols are constantly being developed. Typically, the communication mechanisms and protocol specifics (e.g., device and topology discovery protocols, bridging protocols, etc.) are unique to each networking technology. In this disclosure the terms "access technology" and "communication protocol" may be used interchangeably to refer to the different protocols and technologies that may be used in a mixed communication network. A mixed communication network may also be referred to as a hybrid communication network.

Given the proliferation of devices and access technologies, it is desirable to create networks that allow efficient communication via a variety of different access technologies and communication paths. Accordingly, improvements in communication networks are desired.

SUMMARY

Disclosed are various embodiments for a source device to obtain, from an intermediate device of a communication network, characteristic information about at least one communication path to a destination device. In one embodiment, a subscription message is sent from a source device (i.e. first device) to an intermediate device (i.e. a second device), the subscription message requesting a notification subscription regarding characteristic information about at least one communication path between the intermediate device and a destination device (i.e. third device). Responsive to the notification subscription, at least one notification message is received from the second device regarding the characteristic information of the at least one communication path between the second device and the third device.

In another embodiment, a subscription message is received from a first device by a second device, the subscription message requesting a notification subscription regarding characteristic information about at least one communication path between the second device and a third device. Characteristic information about the at least one communication path between the second device and the third device is determined. At least one notification message is sent from the second device to the first device regarding the characteristic information of the at least one communication path between the second device and the third device.

BRIEF DESCRIPTION OF THE DRAWINGS

The present embodiments may be better understood, and numerous objects, features, and advantages made apparent to those skilled in the art by referencing the accompanying drawings, in which like reference numerals refer to substantially similar items throughout.

FIG. 5 is an example table illustrating message descriptors of a subscription message in accordance with an embodiment of the present disclosure.

FIG. 6 is an example table illustrating message descriptors of a notification message in accordance with an embodiment of the present disclosure.

DESCRIPTION OF EMBODIMENT(S)

Figure 1:
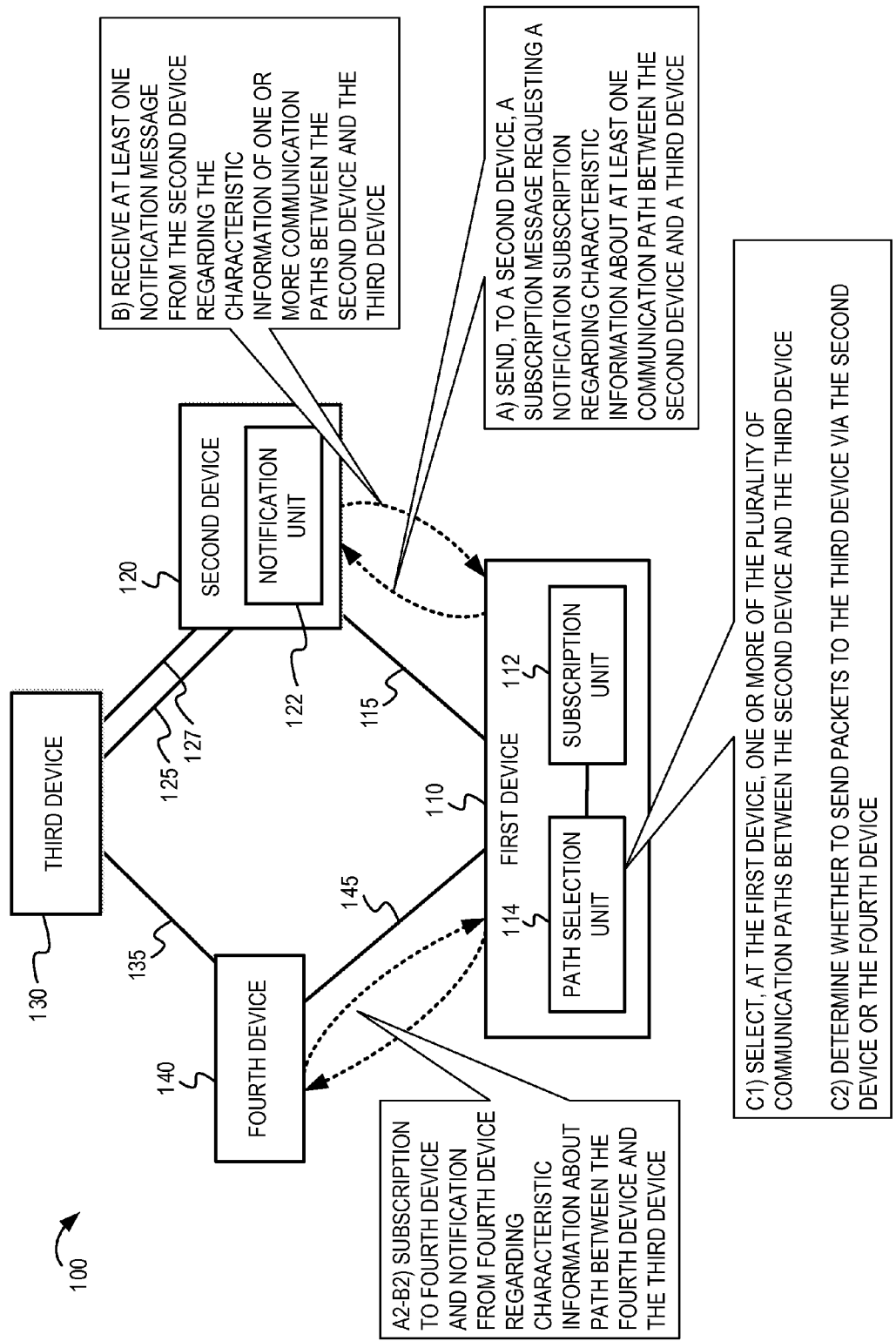
FIG. 1 is an example block diagram illustrating a communication network with a plurality of devices configured to implement subscription and notification messages regarding characteristic information about communication paths of the network in accordance with an embodiment of the present disclosure.

The description that follows includes exemplary systems, methods, techniques, instruction sequences, and computer program products that embody techniques of the present inventive subject matter. However, it is understood that the described embodiments may be practiced without these specific details. For instance, although examples refer to communication paths in a mixed communication network, the present disclosure relates to notification subscriptions to obtain characteristic information regarding a communication path in a variety of network topologies. In other instances, well-known instruction instances, protocols, structures, and techniques have not been shown in detail in order not to obfuscate the description.

Various embodiments are presented of a system and method for providing communication path information in a communication network. The communication network may be implemented in a home (e.g., as a convergent digital home network, "CDHN") or business, as desired. The network may include a plurality of devices using a plurality of different communication protocols, and may therefore be a "mixed communication network". In a mixed communication network (such as a converged digital home network, or P1905.1 compliant network, which may also be referred to as a hybrid communication network, or hybrid network), a network may allow for the utilization and interfacing of heterogeneous networking technologies. For example, IEEE P1905.1 defines an abstraction layer for multiple home network technologies that provides a common interface to the several popular network technologies: IEEE 1901 over powerlines, Wi-Fi/IEEE 802.11 for wireless, Ethernet over twisted pair cable and MoCA 1.1 over coax. The devices may be any of a variety of devices, such as desktop computers, laptops, netbooks, tablets, smart phones, displays, audio video devices, gaming consoles, home appliances, controlling devices (e.g., for lights, air conditioning, alarm systems, etc.), etc.

Due to various topologies that may be implemented in a mixed communication network, a device in the network may have more than one access technology connecting to a further device. Furthermore, a device may have multiple paths (i.e. routes) which may be used to communicate with another device. However, the source device may not be directly connected to the destination device. For example, the source device may be configured to communicate with the destination device via one or more intermediate devices. In one example topology, there may be a plurality of communication paths between the source device and the destination device. In another example topology, a first communication path may use a first intermediate device and a second communication path may use a second intermediate device. Alternatively, a single intermediate device may provide a plurality of paths to the destination device. For example, the source device may be coupled to the first intermediate device which may be configured to communicate with the destination device via a first communication path (e.g., using a first communication protocol) and/or a second communication path (e.g., using a second communication protocol). Thus, the plurality of communication paths may include one or a plurality of intermediate devices, as desired. Selecting a preferred communication path may be improved by obtaining characteristic information (e.g. link metric information) for a portion of the communication path that is connected via an intermediate device.

Accordingly, in a first embodiment of the present disclosure, a source device (i.e. a first device) may send one or more subscription messages to an intermediate device (i.e. a second device) to request a notification subscription regarding characteristic information about a plurality of communication paths from the intermediate device to a destination device (i.e. a third device). As shown in several of the figures and examples herein, in one embodiment the intermediate device is a neighbor (and vice versa) of the destination device (i.e. there is at least one direct connection between the intermediate device and the destination device). As discussed above, the intermediate device may have one or a plurality of communication paths to the destination device (e.g., using one or more of a plurality of different communication protocols). The subscription message(s) may request notification of characteristic information about the communication paths, such as status or utilization of the communication paths. The subscription message(s) may include indicators for the first device to request notification messages from the second device regarding specific destination interfaces of the third device. The second device can then determine characteristic information about the communication paths between the second device and the specified destination interfaces of the third device.

In some embodiments, the one or more subscription messages may indicate whether the source device wishes to receive characteristic information on a periodic basis (e.g., based on a time interval). Alternatively, the one or more subscription messages may indicate if the source device wishes to receive the one or more messages on an event basis (e.g. a "triggered" notification), such as whenever the characteristics of the communication path changes, e.g., by a threshold amount. In response to the subscription messages from the source device, notification messages may be received by the source device (e.g., from each of the intermediate devices) based on the one or more subscription messages sent above. For example, the characteristic information may be sent on a periodic basis or an event basis, e.g., depending on the subscription request sent by the source device.

In response, the source device may determine a communication route for sending information (e.g., via packets) to the destination device. For example, the source device may send the information via a route that is able to provide the information within a desired time frame, at a desired rate, with lower probabilities of errors, etc. based on the characteristic information.

In another embodiment, the source device may send subscription messages to two or more intermediate device (e.g. the second device, as above, and a fourth device), where both the intermediate devices have communication paths to the destination device. In this way, the first device may obtain characteristic information regarding a variety of communication paths to the destination device and determine a selected communication path based upon the characteristic information. Accordingly, the source device may send the data (e.g. data packets) to the appropriate intermediate device based on the determination above. The source device may indicate which communication path to use, e.g., where the intermediate device has more than one possible communication path to the destination device.

The format of the subscription request message may include one or more of the following fields: an identifier (such as a MAC ID) of the third device, a request duration (in seconds) of the subscription (a value of zero cancels a subscription); and interface-specific identifiers (MAC IDs) of specific interfaces of the third device. A response from the second device to the first device may indicate that the subscription is accepted or rejected. The source device may also be configured to send a message to one or more of the intermediate devices to stop receiving characteristic information (e.g., to cancel the subscription), as desired.

The subscription for characteristic information may also specify a type of subscription. Multiple types of subscriptions are contemplated, including a periodic type, an event-triggered type, or a combination of periodic and event-triggered. The periodic type may indicate that the first device wishes to receive link status information on a periodic basis (e.g., based on a time interval, such as every 10 ms, 50 ms, 100 ms, 500 ms, 1 s, 2 s, 5 s, 10 s, etc.). The event-triggered type may indicate that the first device wishes to receive the one or more messages on an event basis, such as whenever the characteristics of the communication path changes, e.g., by a threshold amount. For example, the first device may indicate that characteristic information should be sent if the available bandwidth of the communication path increases or decreases by a threshold amount, such as 5%, 10%, 20%, 25%, 30%, 50%, 75%, etc.

The characteristic information may include information about capacity, technology type, usage, or other additional information indicative of the quality of the communication path. For example, characteristic information may include, as non-limiting examples, one or more of: status of the communication path (e.g., on, off, functional, nonfunctional, etc.), utilization of the communication path (e.g., a percentage of capacity of the communication path, possibly provided as a median, average, low, high, etc. value), throughput of the communication path (e.g., maximum, current, minimum, available, etc.), available bandwidth of the communication path (e.g., current, average over time, etc.), error rate of the communication path, quality of service of the communication path, and/or type of the communication path (e.g., the communication protocol used, wired, wireless, cable, type of cable, etc.), among other possibilities.

In the foregoing detailed descriptions of the figures, various example embodiments are described. It should be understood that the figures and accompanying descriptions are provided as examples only and are not intended to limit the scope of the embodiments described herein. In an example used throughout this disclosure, a first device (as a source device) obtains characteristic information about one or more communication paths from a second device (as an intermediate device) or a fourth device (as another intermediate device) to a third device (as destination device). To aid in understanding various topologies, attention is drawn to FIG. 1.

FIG. 1 is an example block diagram illustrating a communication network with a plurality of devices configured to implement subscription and notification messages regarding characteristic information about communication paths of the network. FIG. 1 depicts a communication network 100 comprising a first device 110, a second device 120, a third device 130, and a fourth device 140. It is noted, however, that in some examples one or more of the devices 110, 120, 130, 140 may be hybrid network devices configured with one or more access technologies. The first device 110 comprises a subscription unit 112 and a path selection unit 114. In some implementations, the subscription unit 112 and the path selection unit 114 may be implemented in one or more communication units of the first device 110 that implement protocols and functionality to enable communications via the communication network 100. The second device 120 comprises a notification unit 122. It should be understood that each device may include a subscription unit, path selection unit, and/or notification unit, as needed to implement subscription and notification features. For example, the first device 110 may also have a notification unit (not shown) to answer subscription requests from another device.

In some implementations, the devices 110, 120, 130, 140 can each be an electronic device, such as a laptop computer, a tablet computer, a mobile phone, a smart appliance, a gaming console, a desktop computer, or another suitable electronic device. One or more of the devices 110, 120, 130, 140 may be a network node, such as an access point, gateway device, or other such device configured to provide network connectivity between two or more network segments.

In the example communication network 100, first device 110 has a network connection 115 to second device 120 and a connection 145 to fourth device 140. However, in the example in FIG. 1, first device 110 does not have a direct connection to the third device 130. For first device 110 to communicate with third device 130, communications must be sent via either the second device 120 or the fourth device 140. The second device 120 has a first communication path 125 to the third device 130 and a second communication path 127 to the third device 130. It should be understood that the first communication path 125 and second communication path 127 may comprise different communication protocols or access technologies. Fourth device 140 also has a communication path 135 to third device 130.

Having identified the devices and communication paths of this example communication network, various examples will now be described using FIG. 1.

In accordance with one embodiment, the first device 110 may have a need to communicate with the third device 130 via the second device 120 (for example, if the fourth device 140 were not present in the example communication network 100). Since the second device 120 has more than one communication path 125, 127 to the third device 130, it may be desirable for the first device 110 to select a communication path for the communication. Beginning at stage A, the first device 110 sends, to the second device 120, a subscription message requesting a notification subscription regarding characteristic information about at least one communication path (e.g. 125 and/or 127) between the second device 120 and the third device 130. Various examples of the subscription message may include message elements such as those described in FIG. 6. For example, the subscription message may request a periodic notification, may specify a duration for the subscription, may indicate the requested characteristics, may request a triggered notification, etc. The subscription message may indicate which ones of the plurality of communication paths 125, 127 are associated with the notification subscription. The subscription message may be generated by the subscription unit 112 or another component of the first device 110.

At stage B, the first device 110 receives at least one notification message from the second device regarding the characteristic information about the communication paths identified in the subscription message. For example, if the subscription message requests notification regarding the first communication path 125 and the second communication path 127, then the notification message may include characteristic information for each of the communication paths 125, 127. At stage B, in one example embodiment, the characteristic information for the second communication path 127 may be included in a separate notification message than the notification message which includes characteristic information for the first communication path 125. Alternatively, a single notification message may include characteristic information for each of the communication paths 125, 127. The notification message(s) of stages B may be generated by the notification unit 122 or another component of the second device 120.

At stage C1, the first device 110 selects one or more of the plurality of communication paths 125, 127 between the second device 120 and the third device 130 to communicate from the first device 110 to the third device 130 via the second device 120. The selection is based upon the characteristic information about each of the communication paths 125, 127.

Algorithms used to select a communication path based on the link characteristic information may operate according to known selection parameters not discussed in this disclosure in the interest of brevity. For example, the first device may select a communication path after determining which path(s) have better-performing link characteristics, such as delay, throughput, error rate, or which path(s) are least likely for bottleneck, or errors. In some embodiments, the first device may select a communication path that involves a preferred access technology between the second device and the third device. In one specific example, the characteristic information may indicate that communication path 125 is 60% utilized, has a throughput of 100 Mbps and has an access technology type of Ethernet. The characteristic information may indicate that communication path 127 is 10% utilized, has a throughput of 2 Mbps and has an access technology type of powerline communications. The path selection unit 114 or another component of the first device 110 may analyze the characteristic information to determine that the first communication path 125 should be selected.

In accordance with another embodiment, the first device 110 may have the option to communicate with the third device 130 via either the second device 120 or the fourth device 140. Similar to the previous example, the first device 110 may send a subscription message (at stage A) to the second device 120 and receive at least one notification message (at stage B) to obtain characteristic information about at least one communication path from the second device 120 to the third device 130. At stages A2-B2, the first device 110 may also send a further subscription message to the fourth device 140 and receive corresponding notification message(s) from the fourth device 140 regarding characteristic information about the communication path 135 between the fourth device 140 and the third device 130.

At stage C2, the first device 110 may determine whether to send data (e.g. packets) to the third device 130 via either the second device 120 or the fourth device 140 based upon the characteristic information received for the various communication paths 135, 125, and 127. In addition to the characteristic information for communication paths 135, 125, and 127, the first device 110 may also take into account information regarding the communication paths 145 and 115, in determining whether to send data via second device 120 or the fourth device 140.

Figure 2:
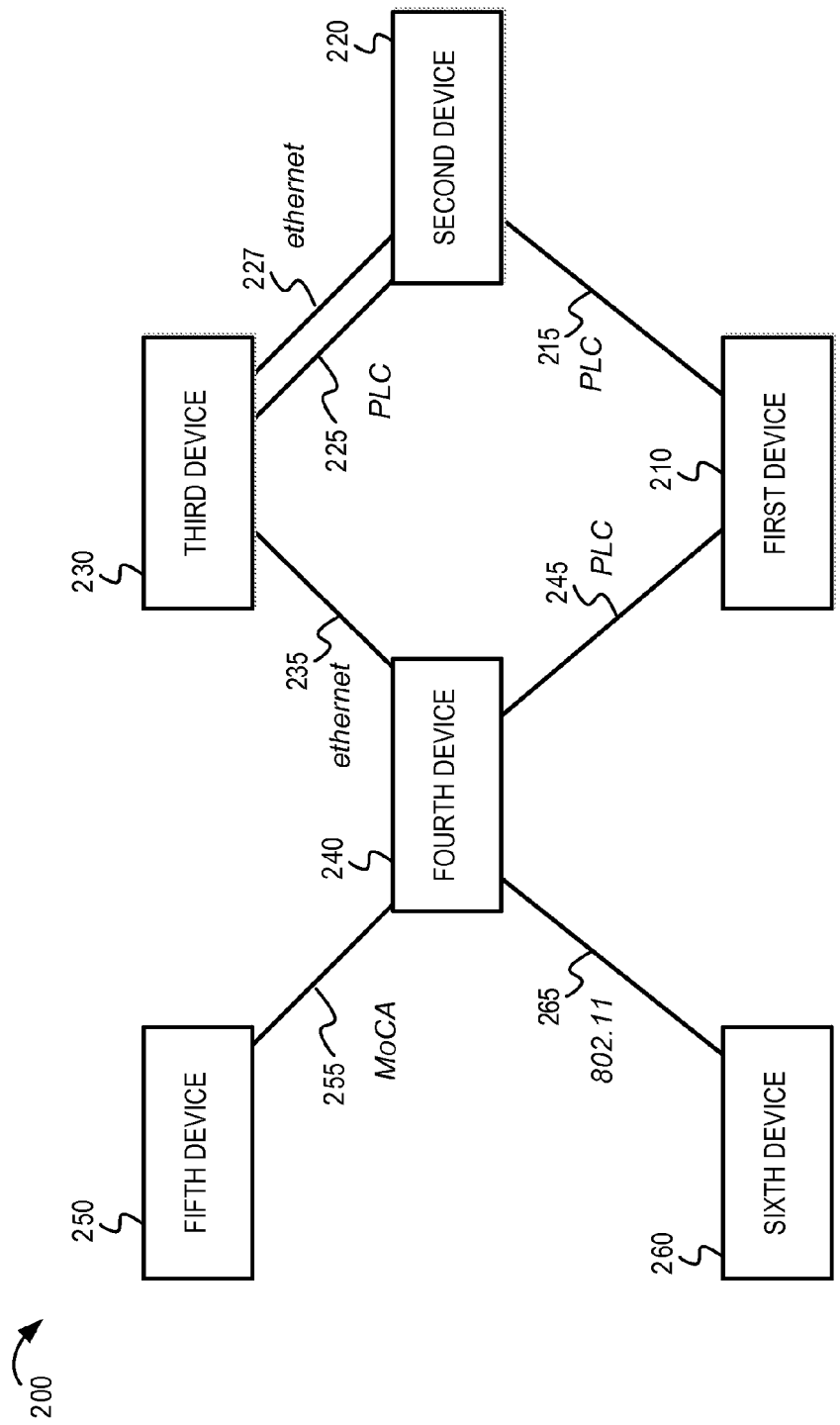
FIG. 2 illustrates an exemplary mixed communication network in accordance with an embodiment of the present disclosure.

FIG. 2 illustrates an exemplary mixed communication network 200 according to one embodiment. As shown, the mixed communication network 200 may include a fourth device 240 (e.g. an access point) which is coupled to a plurality of devices via a plurality of different communication protocols. For example, the fourth device 240 may be coupled (shown as line 245) to a first device 210 via a powerline communication protocol (PLC), such as IEEE 1901 compliant protocol. The first device 210 may be any of a variety of devices, such as light controllers, digital picture frames, computer systems, home appliance controllers, etc. The fourth device 240 may also be coupled (shown as line 265) to a sixth device 260 via a Wi-Fi communication protocol (e.g., 802.11 communication protocol). Exemplary sixth device 260 may be desktop computers, laptop computers, tablets, netbooks, cell phones, personal digital assistants, music players, video players, etc. Additionally, the fourth device 240 may be coupled (shown as line 255) to a fifth device 250 via a multimedia over coax (MoCA) protocol. Exemplary fifth device 250 includes various devices, such as audio video devices (e.g., receivers, displays, amplifiers, video game consoles, etc.). Finally, the fourth device 240 may be coupled (shown as line 235) to a third device 230 over a wired connection, such as Ethernet (e.g., IEEE 802.3). The third device 230 may be any device supporting such wired connections.

The mixed communication network may have a variety of topologies. For example, in one embodiment, each device in the mixed communication network may be directly coupled (without intermediary devices) to an access point (e.g. fourth device 240). Thus, in this embodiment, the access point may act as a central router for all of the devices in the mixed communication network. However, in some embodiments, not all devices may be directly coupled to the access point. For example, as shown in FIG. 2, the fourth device 240 may communicate with a second device 220 via an intermediary device, such as the first device 210 and/or the third device 230. In some embodiments, the intermediary device may use the same communication protocol as it uses to communicate with the fourth device 240. For example, the first device 210 may be coupled (shown as line 215) with the second device 220 and the fourth device 240 via the same PLC protocol. However, the third device 230 may be coupled (shown as line 227) with the second device 220 via a first communication protocol (in this case Ethernet) and also be coupled (shown as line 225) with the second device 220 using a second, different, communication protocol (in this case a PLC protocol). In some embodiments, devices may be able to communicate with each other using more than one communication protocol and/or communication link.

The first device 210 and third device 230 are both considered neighbors to the second device 220 (and vice versa) because there is a direct connection between them. Therefore, the fourth device 240 may send a subscription message to the first device 210 requesting a subscription regarding characteristic information about the communication path 215 from the first device 210 to first device's neighbor, second device 220. It should be understood that fifth device 250 may also send a subscription message to the first device 210 requesting a subscription regarding characteristic information about the communication path 215 from the first device 210 to first device's neighbor, second device 220. While not specifically limited to subscriptions at neighboring devices, the present disclosure provides embodiments which are well suited to subscribing to characteristic information about communication paths between neighboring devices.

In one embodiment, the mixed communication network may include more than one hub or router (in addition to the fourth device 240 acting as an access point). For example, the third device 230 may be a second hub that is capable of performing communication routing for the mixed communication network. In one embodiment, the routing intelligence may be distributed among a plurality of devices in the mixed communication network. In further embodiments, there may be no centralized or dedicated routing functions. For example, the access point may be excluded and/or the network may be a peer-to-peer network.

Thus, the mixed communication network may include a plurality of interconnected devices communicating using a plurality of different communication protocols. Additionally, the mixed communication network may include devices which support more than one communication protocol, such as the fourth device 240, supporting MoCA, Wi-Fi, Ethernet, PLC, etc. and the second and third devices supporting both PLC and Ethernet. Note that the above described communication protocols are exemplary only and further communication protocols may be supported, such as WiMax, USB, ThunderBolt, Bluetooth, CDMA, GSM, LTE, etc.

In some embodiments, the mixed communication network may be particularly well-suited for a home network and may be referred to as a "convergent digital home network". However, although various descriptions herein are provided in terms of CDHN and P1905.1 devices for ease of understanding, the disclosed embodiments may equally apply to other networks and technologies. In general, CDHN (e.g., via an access point) may allow for the utilization and interfacing of heterogeneous networking technologies. As discussed above, example heterogeneous networking technologies may include powerline networks (IEEE P1901), Wi-Fi (IEEE 802.11), Ethernet (IEEE 802.3) and MoCA 1.1, among others. CDHN may include a dynamic interface selection for transmission of packets arriving from any interface (e.g., upper protocol layers or underlying network technologies). End-to-end Quality of Service (QOS) may also be supported. In some embodiments, the CDHN may interface with another network (e.g., a LAN provided by a service provider). The CDHN may provide management, security, QOS, medium access among the various networking technologies.

Figure 3:
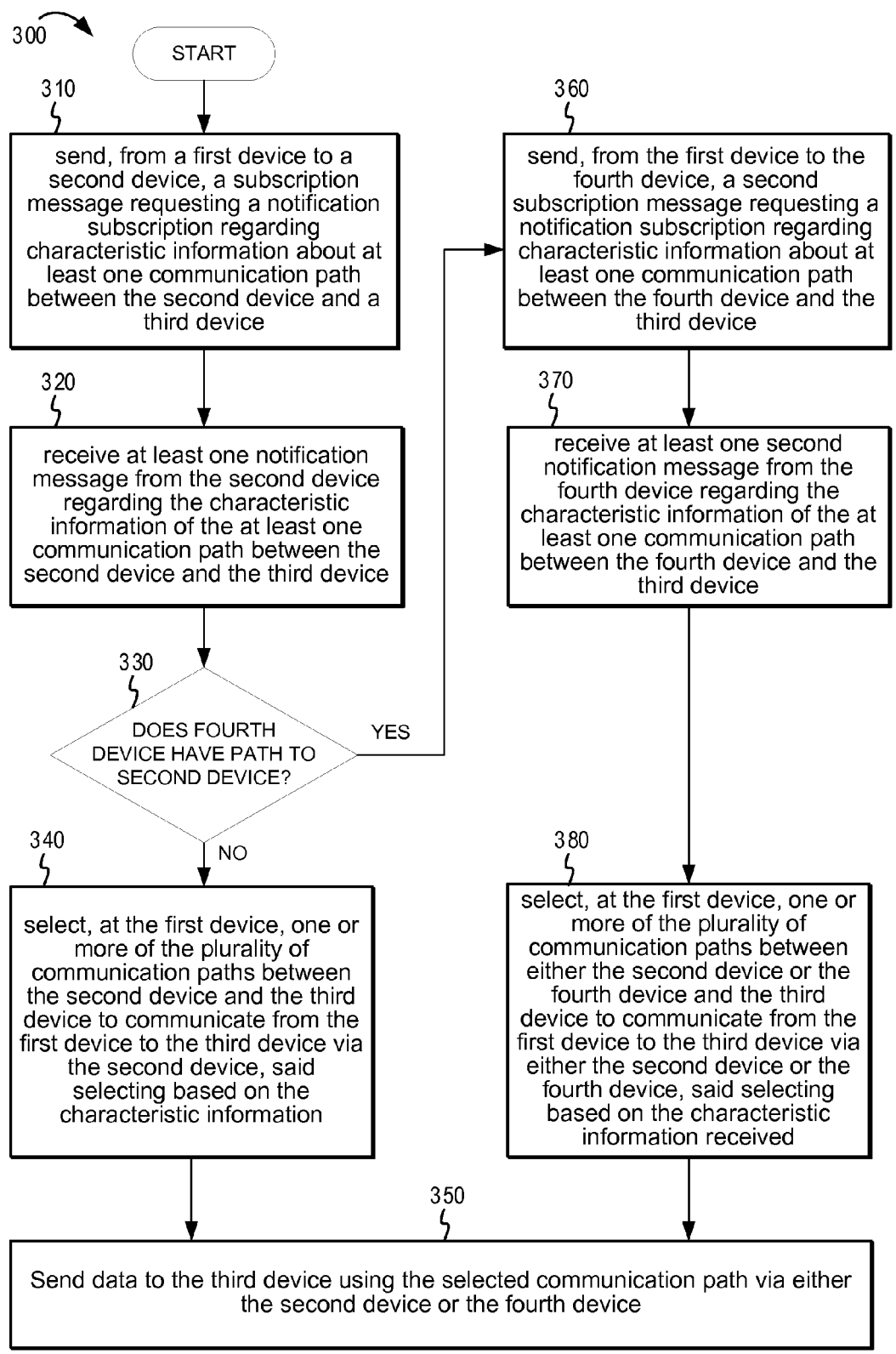
FIG. 3 is a flowchart diagram illustrating one embodiment of a method performed by a first device of a communication network in accordance with an embodiment of the present disclosure.

Some or all of the devices discussed above may be configured to perform the method described in FIG. 3.

FIG. 3 illustrates a method 300 for communicating in a mixed communication network. The method shown in FIG. 3 may be used in conjunction with any of the computer systems or devices shown in the above Figures, among other devices. For example, the method may be utilized with the mixed communication network shown in FIG. 2. However, the method may be used for other networks, e.g., including a single communication protocol, without a central access point, such as a distributed or peer-to-peer network, etc. In various embodiments, some of the method elements shown may be performed concurrently, in a different order than shown, or may be omitted. Additional method elements may also be performed as desired. As shown, this method may operate as follows.

In a network, a first device (a "source device") may wish to send information to or generally communicate, via a second device (an "intermediate device"), with a third device (a "destination device"). To aid in the selection of a communication path, the first device may implement the method 300, or a portion thereof. At 310, the first device sends a subscription message to the second device requesting a notification subscription regarding characteristic information about at least one communication path between the second device and the third device. It should be noted that the first device may send one or more such subscription messages to one or more intermediate devices (such as second device 120 and fourth device 140 of FIG. 1) regarding a plurality of communication paths from the one or more intermediate devices to the third device. As discussed above, in one example, the second device may have one or a plurality of communication paths to the third device or a further intermediate device (e.g., using one or a plurality of different communication protocols, as desired). These messages may request provision of a notification subscription regarding characteristic information (also referred to as link characteristics or link metric information) of the communication paths.

For example, the characteristic information may include status of the communication path (e.g., on, off, functional, nonfunctional, etc.), utilization of the communication path (e.g., a percentage of capacity of the communication path, possibly provided as a median, average, low, high, etc. value), throughput of the communication path (e.g., maximum, current, minimum, available, etc.), available bandwidth of the communication path (e.g., current, average over time, etc.), error rate of the communication path, quality of service of the communication path, and/or type of the communication path (e.g., the communication protocol used, wired, wireless, cable, type of cable, etc.), among other possibilities.

In some embodiments, the one or more messages may be considered subscription requests. Accordingly, the one or more messages may indicate a desired subscription length (e.g., in time). Additionally, the one or more messages may indicate whether the source device wishes to receive characteristic information on a periodic basis (e.g., based on a time interval, such as every 10 ms, 50 ms, 100 ms, 500 ms, 1 s, 2 s, 5 s, 10 s, etc.). Alternatively, the one or more messages may indicate if the source device wishes to receive the one or more messages on an event basis, such as whenever the characteristics of the communication path changes, e.g., by a threshold amount. For example, the source device may indicate that characteristic information should be sent if the available bandwidth of the communication path increases or decreases by a threshold amount, such as 5%, 10%, 20%, 25%, 30%, 50%, 75%, etc. Such messages may be particularly valuable when the characteristic information changes by a significant amount, such as greater than 25% or 50%. For an IEEE 802.11 interface, an exemplary "event" can be said to occur if the measured goodput (successful throughput) decreases by 2 Mbps as compared to its previous level, and/or if the measured medium utilization increases by 15% as compared to its previous level. Other examples of event-triggered updates may include a change in received signal strength (RSSI), signal to noise ratio (SNR), or other metrics that may be associated with the quality of wireless or wired connection.

In response to the subscription message(s), at 320, the first device receives at least one notification message from the second device. The notification message includes the characteristic information for communication paths indicated in the subscription message(s). For example, the characteristic information may be sent on a periodic basis or an event basis, e.g., depending on the subscription request sent by the first device. In either case, the characteristic information may be determined by the second device and sent, either according to the periodic basis or based on whether the characteristic information has changed, e.g., by a threshold amount.

As understood in the foregoing description, there may be multiple intermediate devices with connection paths to the third device. At 330, if there is another intermediate device, such as fourth device, then the method 300 may proceed to the operation at 360. If there is not another intermediate device, then the method 300 may proceed to the operation at 340.

At 340, the first device may select one or more of the plurality of communication paths between the second device and the third device to communicate from the first device to the third device via the second device based on the characteristic information about each of the plurality of communication paths. For example, the first device may send the information via a route that is able to provide the information within a desired time frame, at a desired rate, with lower probabilities of errors, etc. based on the characteristic information.

Accordingly, at 350, the first device may send the data to the second device specifying a selected communication path based on the determination above. The first device may indicate which communication path to use, e.g., where the second device has more than one possible communication path to the third device or a further intermediate device.

Returning to the scenario where an additional intermediate device (i.e. the fourth device) has a communication path to the third device, the method 300 proceeds to the operation at 360. At 360, the first device sends a second subscription message to the fourth device requesting a notification subscription regarding characteristic information about at least one communication path between the fourth device and the third device. At 370, the first device receives at least one second notification message from the fourth device regarding the characteristic information of the at least one communication path between the fourth device and the third device. At 380, the first device selects one or more of the plurality of communication paths between either the second device or the fourth device and the third device to communicate from the first device to the third device via either the second device or the fourth device, said selecting based on the characteristic information received. At 350, the first device sends data to the third device using the selected communication path via either the second device or the fourth device.

In some embodiments, the source device may also be configured to send a subscription update message to one or more of the intermediate devices to stop receiving characteristic information (e.g., to cancel the subscription), as desired. It should also be noted that the intermediate device (such as the second device or the fourth device) may send subscription management messages—such as accepting the requested subscription or rejecting the requested subscription.

In the preceding descriptions, the method 300 may be understood using the network 200 shown in FIG. 2. In one specific example used throughout this disclosure, the first device 210 may be considered the source device, the third device 230 the destination device, and the fourth device 240 and second device 220 as the intermediate devices. For example, the first device 210 may request path characteristic information from the fourth device 240 and the second device 220. In this example, the first device 210 may reach the third device 230 via three different communication routes:

a first communication route—including the PLC path 245 between the first device 210 and the fourth device 240 and then the Ethernet path 235 between the fourth device 240 and the third device 230;

a second communication route—PLC path 215 to the second device 220 and PLC path 225 from the second device 220 to the third device 230; or a third communication route—PLC path 215 to the second device 220 and Ethernet path 227 from the second device 220 to the third device 230.

However, the method may also be understood to apply to communications between other devices. For example, briefly consider an alternative scenario where the fifth device 250 is considered the source device and the second device 220 is considered the destination device. In this example, the fifth device 250 may receive path information for the paths between the fourth device 240 and each of the first device 210 (via PLC path 245) and third device 230 (via Ethernet path 235) as well as path information for the paths between the first device 210 (via PLC path 215) and the second device 220 and between the third device 230 and the second device (via each of the Ethernet path 227 and the PLC path 225). For example, the fifth device 250 may request path characteristic information from each of the fourth device 240, the third device 230, and the first device 210. Accordingly, the fifth device 250 may select a communication route using any of three routes, all including an initial path between the fifth device 250 and the fourth device 240 via MoCA path 255.

a first communication route—from the fourth device 240 to the first device 210 to the second device 220, using two separate PLC paths 245, 215;

a second communication route—Ethernet path 235 from the fourth device 240 to the third device 230 and Ethernet path 227 from the third device 230 to the second device 220; or a third communication route—Ethernet path 235 from the fourth device 240 to the third device 230 and PLC path 225 from the third device 230 to the second device 220.

Thus, the method 300 of FIG. 3 may be used for selection of nearby communication routes (e.g., as from the first device to the third device) or may be used for selection of extended communication routes (e.g., from the fifth device to the second device). Further variations and networks are envisioned.

In the interest of consistency, the remaining of this disclosure will continue with the example paths used throughout this disclosure, where the first device 210 may be considered the source device, the third device 230 the destination device, and the fourth device 240 and second device 220 as the intermediate devices.

Figure 4:
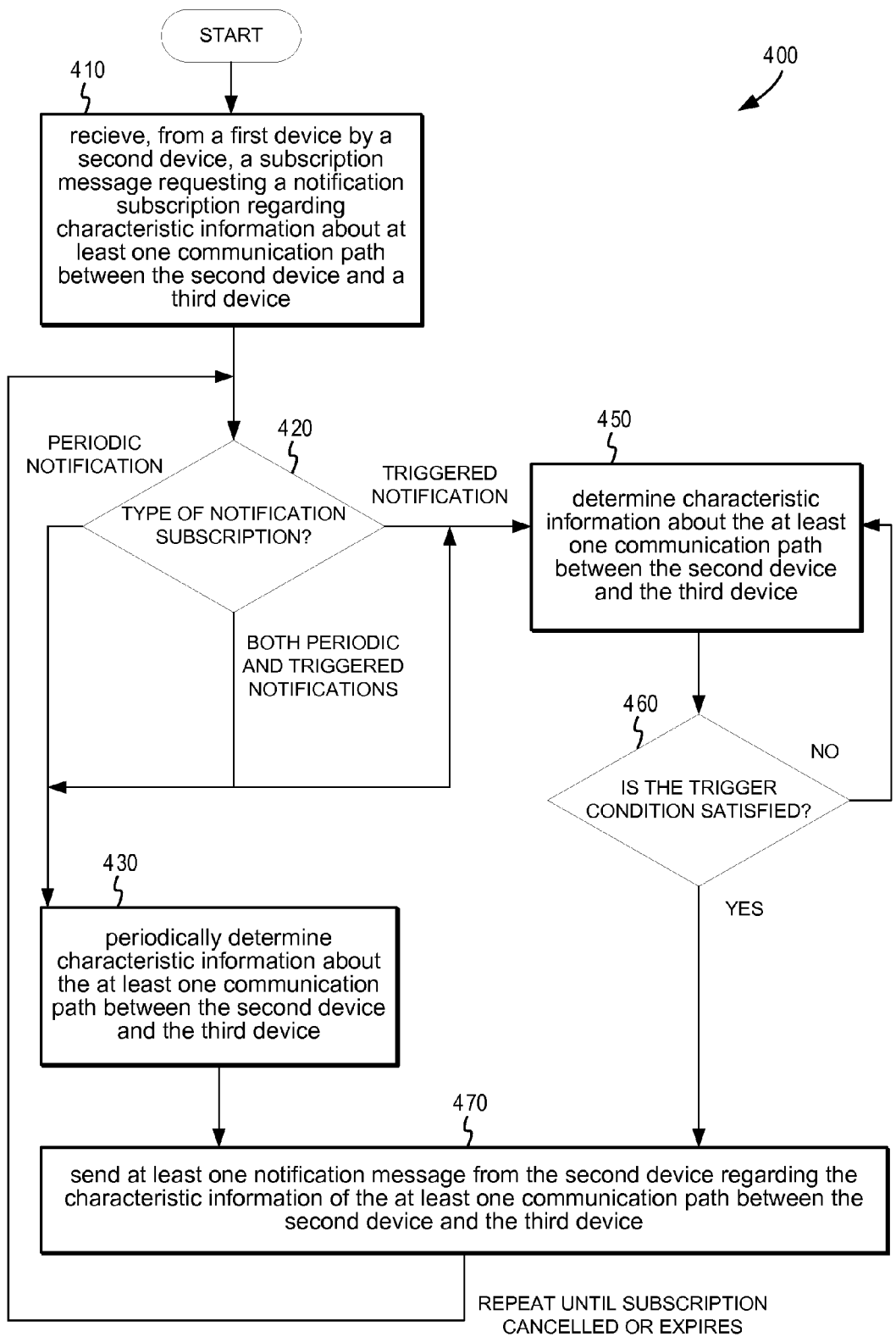
FIG. 4 is a flowchart diagram illustrating one embodiment of a method performed by a second device of the communication network in accordance with an embodiment of the present disclosure.

FIG. 4 is a flowchart diagram illustrating a method 400 performed by an intermediate device (e.g. second device) of the communication network in accordance with an embodiment of the present disclosure.

At 410, the second device receives, from a first device, a subscription message requesting a notification subscription regarding characteristic information about at least one communication path between the second device and a third device. As noted previously, the subscription message may indicate a variety of subscription types, including subscriptions associated with periodic notifications, triggered notifications, or a combination of both periodic and triggered notifications. At 420 the method determines which type of subscription is indicated by the subscription message.

If the subscription includes a request for periodic notifications then, at 430, the second device periodically determines characteristic information about the at least one communication path between the second device and the third device and sends the characteristic information at 470. Parameters specifying the period for periodic notification, time for expiration, or other variables may be included in the subscription message as described with regard to FIG. 6. Alternatively, the parameters may be implied or static according to device implementation.

Returning to the operation at 420, if the subscription includes a request for triggered notification, then the method 400 proceeds to 450. At 450 the second device determines characteristic information about the at least one communication path between the second device and the third device. At 460 the second device determines whether the trigger condition has been met. For example, the second device determines whether the characteristic information has changed beyond a threshold amount. The threshold amount and trigger condition may be specified in the subscription message or may be implied or static according to device implementation.

Once the trigger condition has been satisfied at 460, the method 400 proceeds to operation 470 in which the second device sends at least one notification message from the second device regarding the characteristic information of the at least one communication path between the second device and the third device.

After the operation at 470, the method 400 may repeat the periodic notification subscription or triggered notification subscription until the subscription is cancelled or expires.

This described procedures in FIGS. 3 and 4 may enable a P1905.1 device to subscribe to link metric information at another P1905.1 device. This may be accomplished through three unicast messages: the Link Metric Subscription Request Message, the Link Metric Notification Message, and the Link Metric Notification Confirm Message, which are described below.

In some embodiment, a P1905.1 compliant device may be required to support a minimum number of concurrent subscriptions from other devices in the network. In one embodiment, a subscriber P1905.1 device can have at most one subscription to another P1905.1 device at any given time.

The table in FIG. 5 illustrates exemplary information that may be included in a Link Metric Subscription Request Message 500 that may be used by P1905.1 compliant devices. In the example table, the Link Metric Subscription Request Message is depicted using Type-Length-Value (TLV) formatting. TLV specifies a format in which protocol information can be encoded in a packet. Information is provided in fields, each of which has a type, and requires a certain number of bytes (length). It should be understood that other formatting or message structures may also be used with one or more of the message fields described in FIG. 5. A Link Metric Subscription Request Message may be sent from a first device to a second device at any time. A Link Metric Subscription Request Message may include the device MAC ID (or any suitable identification) of a neighbor (e.g. third device) of the second device, and may specify a requested duration for the subscription. The message may also include, for every interface of the third device, an indication whether the first device desires periodic and/or event-triggered link metric information updates (or no information at all for a particular interface) from the second device. The variable n denotes the number of interfaces of the destination device. It should be understood that the first device may indicate itself as the third device (e.g. destination device) such that it requests information from the second device regarding link metric information from the second device's connections to the first device.

The second device may modify the subscription duration and indicate such modification in the Link Metric Notification Message by including the modified subscription duration. If the first device does not receive a Link Metric Notification Message in response to a Link Metric Subscription Request Message, it may resend the Link Metric Subscription Request Message.

A subscription may be associated with a Subscription ID. The first device may modify an existing subscription by changing the subscription duration, cancelling the subscription. To modify an existing subscription, the first device may send a new Link Metric Subscription Request Message with the Subscription ID and the modified subscription information.

The table in FIG. 6 illustrates exemplary information that may be included in a Link Metric Notification Message 600 that may be used by P1905.1 compliant devices. The Link Metric Notification Message is depicted using Type-Length-Value (TLV) formatting as a non-limiting example format. The variable n denotes the number of interfaces of a destination device. The Link Metric Notification Message may be sent as a periodic or triggered notification message responsive to subscription that a first device has requested at the second device. For example, the second device may send a Link Metric Notification Message to the first device (subscriber) upon receipt of a Link Metric Subscription Request Message. The second device may modify the requested subscription duration (or other subscription parameters) received in the Link Metric Subscription Request Message and include the modified subscription information in the Link Metric Notification Message. A value of zero may indicate non-acceptance of the subscription request.

The second device may also cancel or modify an existing subscription by sending a Link Metric Notification Message with the Subscription ID, the subscription duration appropriately set, to the first device. A value of zero may indicate cancellation of subscription.

The second device may send a Link Metric Notification Message to the first device, including link metric information about communication paths to a destination device, with a frequency as indicated in the Link Metric Subscription Request message.

If the first device requests periodic link metric information updates for any communication path to the destination device, the second device may send a Link Metric Notification Message including the information on a periodic basis (e.g., every 1 second).

If the first device requests that link metric information updates for any communication path to the destination device be sent when an "event" occurs (i.e. a trigger condition is met), the second device may send a Link Metric Notification Message whenever such an event occurs. An "event" may be associated with a specific interface or communication path, and may be defined with regard to the transmission characteristics of the underlying medium over which packets are transmitted from the interface. For every interface in a P1905.1-compliant device, the definition of an "event" may be standardized. For an IEEE 802.11 interface, an exemplary "event" can be said to occur if the measured goodput (successful throughput) decreases by 2 Mbps as compared to its previous level, and/or if the measured medium utilization increases by 15% as compared to its previous level.

If the first device requests both periodic as well as event-triggered link metric information updates, for any communication path to the destination device, the second device may send a Link Metric Notification Message periodically AND when an event occurs.

If the subscription/notification protocol includes acknowledgement of notification messages, when a first device receives a Link Metric Notification Message, the first device may respond with a Link Metric Notification Confirm Message including the same Subscription ID as received in the Link Metric Notification Message. This allows for acknowledgment or confirmation that a Link Metric Notification Message was received. If a Link Metric Notification Confirm Message is not received by the second device in response to a Link Metric Notification Message, the second device may resend the message up to specified (e.g., Notification_Retransmit) number of times.

It should be noted that the tables in FIGS. 5 and 6 are examples and variations of the messages are readily conceived by persons of skill in the art without departing from the scope of the present disclosure. For example, although FIGS. 5 and 6 show example formats and type-length-value (TLV) structures, in other implementations the Link Metric Subscription Request message and Link Metric Notification Message may be named, formatted or structured differently.

It should be understood that FIGS. 1-7 are examples meant to aid in understanding embodiments and should not be used to limit embodiments or limit scope of the claims. Embodiments of each device described herein may comprise additional circuit components, different circuit components, and/or may perform additional operations, fewer operations, and operations in a different order, operations in parallel, and some operations differently. It should be understood that although examples refer to a first device obtaining characteristic information for paths in a hybrid communication network, embodiments are not so limited.

Embodiments of each device described herein may take the form of an entirely hardware embodiment, a software embodiment (including firmware, resident software, microcode, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a machine-readable storage medium, or a machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable signal medium may be transmitted using any suitable medium, including, but not limited to, wireline, wireless, optical fiber cable, RF, or other communications medium.

Computer program code for carrying out operations of the embodiments of each device described herein may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider)

Figure 7:
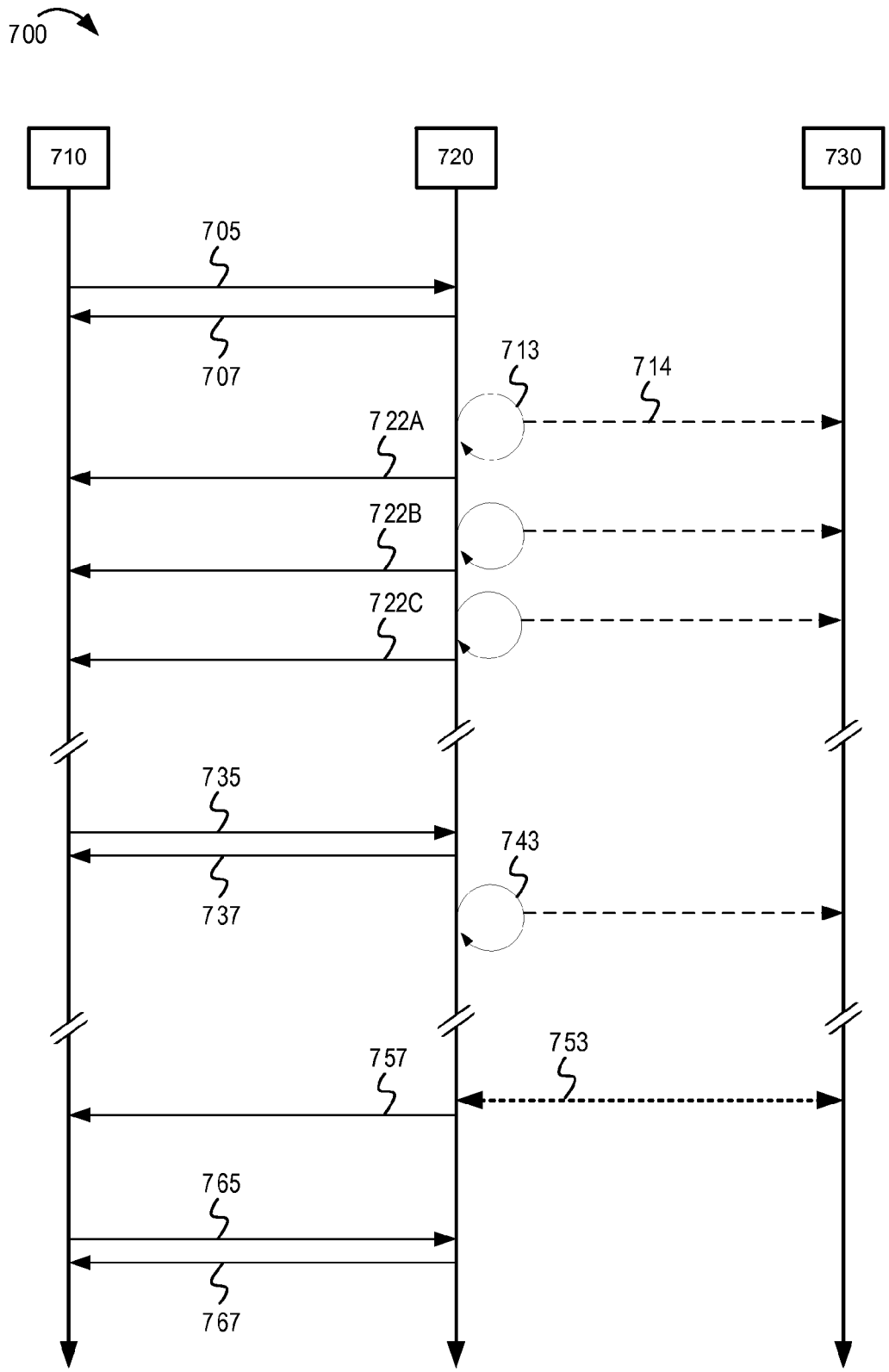
FIG. 7 is a message flow diagram illustrating various examples of subscription messages and notification messages in accordance with embodiments of the present disclosure.

FIG. 7 is a message flow diagram 700 illustrating various examples of subscription messages and notification messages. The subscription messages and/or notification messages may take a similar form as those described above in FIGS. 5 and 6, or may have other forms or information components. In FIG. 7, a first device 710 is establishing a notification subscription to a second device 720 regarding characteristic information about at least one communication path between second device 720 and a third device 730.

Beginning from the top, the first device 710 sends a subscription message 705 (e.g. a Link Metric Subscription Request Message such as in FIG. 5) to second device 720. The subscription message may specify whether the subscription is a periodic subscription, triggered notification subscription, or both, and may specify one or more communication paths (or interfaces) that second device 720 has to communicate with the third device 730. At response message 707, the second device 720 may send back a confirmation acknowledging the subscription message, and either accepting, modifying, or rejecting the requested subscription. In the example of FIG. 7, the subscription message 705 indicated a periodic subscription, and the response message 707 accepts the subscription. The response message 707 may be in the form of a Link Metric Notification Message as described in FIG. 6, or some other message format used as a response to the subscription message 705.

At process 713, the second device 720 may determine the link characteristic information about at least one communication path 714 to the third device 730. It should be understood that determining characteristic information may be ongoing or periodic and may be performed at any time by second device 720 regardless of whether there is an active subscription. Periodic notification messages 722A, 722B, 722C are sent from the second device 720 to the first device 710 to indicate characteristic information about at least one communication path between the second device 720 and the third device 730.

In the example of FIG. 7, a subsequent subscription message 735 may be communicated from the first device 710 to the second device 720 to alter the subscription. It should be understood in other examples the subscription message 735 may be a first subscription message creating a new subscription. In the example, the subscription message 735 is used to change the type of subscription from periodic notifications to triggered notifications (e.g. event-based notification). Similar to response message 707, the second device may send a response message 737 acknowledging the change to the subscription. At process 743, the second device 720 monitors the characteristic information about the subscribed communication path to the third device 730 for any changes which might satisfy the trigger condition.

At event 753 (shown as double-headed arrow), the second device 720 determines that a trigger condition has been satisfied because the characteristic information about a communication path to the third device 730 has changed beyond a threshold amount. Many examples are provided in this disclosure regarding types of trigger conditions which may be detected by the second device 720. Responsive to the event 753, the second device sends a triggered notification message 757 to indicate characteristic information about at least one communication path between the second device 720 and the third device 730.

In yet another example illustrated in FIG. 7, a subscription may be cancelled. At subscription message 765, the first device 710 cancels an existing subscription to second device 720. The cancellation may be indicated using a common subscription message, such as the example described in FIG. 5, by setting a parameter to particular setting associated with cancelling the subscription. In response message 767, the second device 720 may acknowledge the cancellation.

It should be understood that each of the messages may be acknowledged or unacknowledged, depending on the configuration of the protocol. For example, as described in FIG. 6, each of the notification messages 722A, 722B, 722C, 757 may be acknowledged by the first device 710 sending an acknowledgement message back to the second device. Other well established mechanisms for acknowledgment and confirmation of communication messages may be used.

Figure 8:
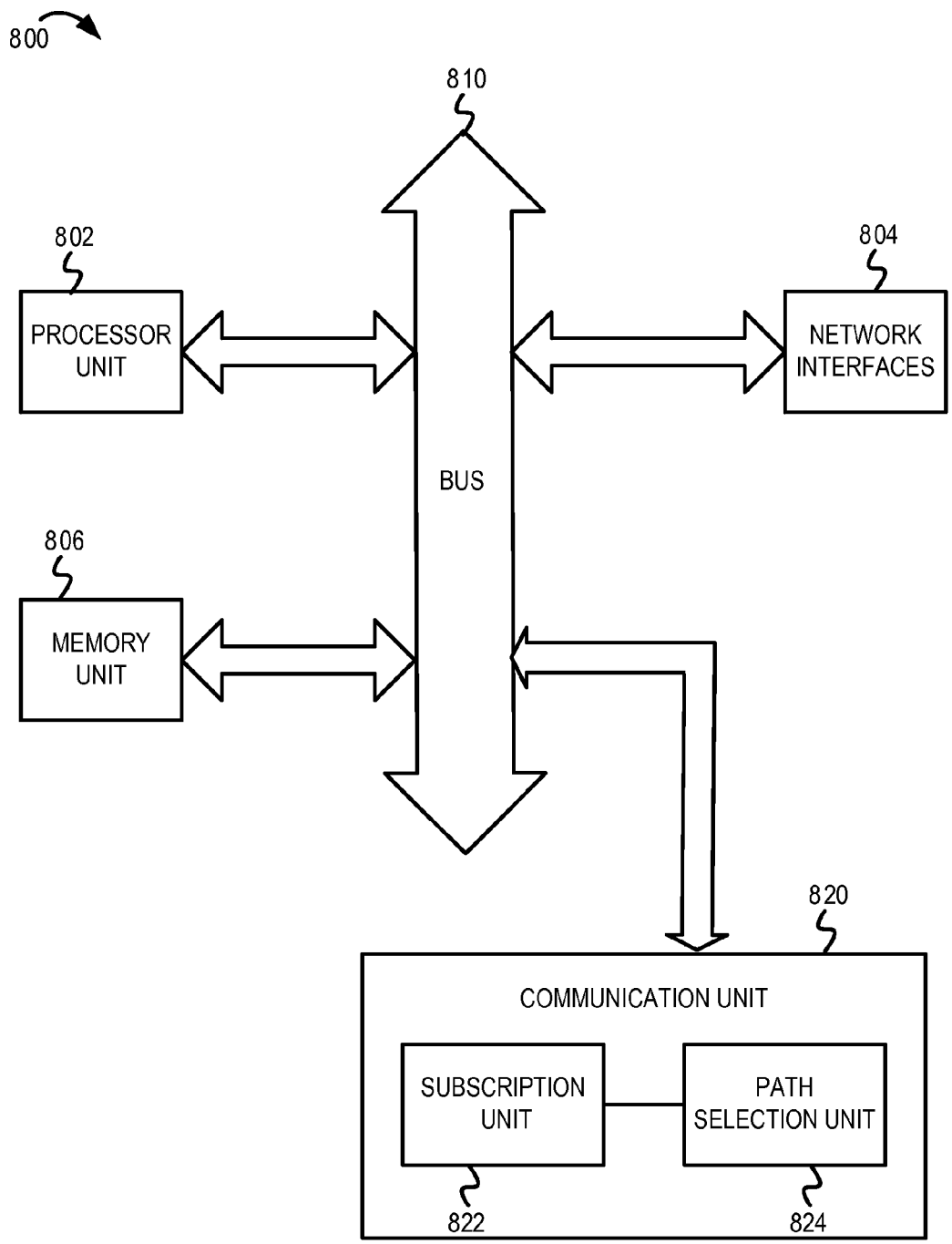
FIG. 8 is a block diagram of one embodiment of an electronic device including a subscription mechanism in accordance with an embodiment of the present disclosure.

FIG. 8 is an example block diagram of one embodiment of a first device (e.g. first device 110, 210) capable of obtaining path characteristic information from one or more intermediate devices in accordance with an embodiment of this disclosure. In some implementations, first device is an electronic device 800 and may be one of a laptop computer, a tablet computer, a mobile phone, a power line communication device, a gaming console, or other electronic systems comprising functionality to communicate across multiple communication networks (which form the hybrid communication network). The electronic device 800 includes a processor unit 802 (possibly including multiple processors, multiple cores, multiple nodes, and/or implementing multi-threading, etc.). The electronic device 800 includes a memory unit 806. The memory unit 806 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 800 also includes a bus 810 (e.g., PCI, ISA, PCI-Express, HyperTransport®, InfiniBand®, NuBus, AHB, AXI, etc.), and network interfaces 804 that include at least one of a wireless network interface (e.g., a WLAN interface, a Bluetooth® interface, a WiMAX interface, a ZigBee® interface, a Wireless USB interface, etc.) and a wired network interface (e.g., a power line communication interface, an Ethernet interface, etc.). In some implementations, the electronic device 800 can comprise a plurality of network interfaces—each of which couples the electronic device 800 to a different communication network. For example, the electronic device 800 can comprise a power line communication interface and a WLAN interface that couple the electronic device 800 with a power line communication network and a wireless local area network respectively.

The electronic device 800 also includes a communication unit 820. The communication unit 820 comprises a subscription unit 822 and a path selection unit 824. As described above in FIG. 1, the communication unit 820 implements functionality to obtain characteristic information about at least one communication path from an intermediate device to a destination device and select a selected communication path based upon the characteristic information. The subscription unit 822 can send a subscription request message and receive one or more notification message(s) regarding characteristic information about at least one communication path. The path selection unit 824 can then select a selected communication path based upon the received characteristic information. The communication unit 820 may then send data to the destination device via the selected communication path. For example, the data may be transmitted using one of the network interfaces 804. It should be understood that in some embodiments, the network interface 804 comprises part of the communication unit 820 or may be a separate device (as shown).

Any one of these functionalities may be partially (or entirely) implemented in hardware and/or on the processor unit 802. For example, the functionality may be implemented with an application specific integrated circuit, in logic implemented in the processor unit 802, in a co-processor on a peripheral device or card, etc. Further, realizations may include fewer or additional components not illustrated in FIG. 8 (e.g., video cards, audio cards, additional network interfaces, peripheral devices, etc.). The processor unit 802, the memory unit 806, and the network interfaces 804 are coupled to the bus 810. Although illustrated as being coupled to the bus 810, the memory unit 806 may be coupled to the processor unit 802.

While the embodiments are described with reference to various implementations and exploitations, it will be understood that these embodiments are illustrative and that the scope of the inventive subject matter is not limited to them. In general, techniques for obtaining characteristic information about at least one communication path at an intermediate device is described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for communicating in a network, the method comprising:
   transmitting a request message from a first device to a second device, the request message for specifying a neighbor of the second device, wherein the request message comprises a request for link metric information about at least one connection between the second device and the neighbor, wherein a third device is the neighbor of the second device specified in the request message; and
   receiving a response message from the second device in response to the request message, the response message including the link metric information determined by the second device.

2. The method of claim 1, wherein the network comprises a hybrid communication network having a plurality of connections between the second device and the third device.

3. The method of claim 1, wherein the request message identifies a plurality of connections between the second device and the third device.

4. The method of claim 1, wherein the link metric information included in the response message comprises interface-specific link metric information about each of a plurality of connections between the second device and the third device.

5. The method of claim 4, further comprising:
   selecting, at the first device, one of the plurality of connections between the second device and the third device to communicate from the first device to the third device via the second device, said selecting based, at least in part, on the link metric information.

6. The method of claim 1, wherein the request message comprises a subscription message that establishes a notification subscription.

7. The method of claim 6, wherein the subscription message specifies a time length for the notification subscription.

8. The method of claim 6, further comprising:
   transmitting a subscription cancel message from the first device to the second device to cancel the notification subscription.

9. The method of claim 6, wherein the subscription message indicates that the notification subscription is associated with requesting at least one member of a group consisting of a triggered notification, periodic notifications, and a combination of triggered and periodic notifications.

10. The method of claim 9, wherein the triggered notification is received in response to a change in the link metric information beyond a threshold amount.

11. The method of claim 1, wherein the link metric information about the at least one connection comprises first link metric information, the method further comprising:
transmitting, from the first device to a fourth device, a second request message comprising a second request for second link metric information about at least a second connection between the fourth device and the third device; and
receiving at least a second response message from the fourth device in response to the second request message, the second response message including the second link metric information about at least the second connection between the fourth device and the third device.

12. The method of claim 11, further comprising:
selecting, at the first device, a communication path to communicate from the first device to the third device via either the second device or the fourth device, said selecting based, at least in part, on the first link metric information and the second link metric information.

13. The method of claim 1, wherein the link metric information includes at least one member of a group consisting of:
utilization of the at least one connection,
percentage of utilization relative to a capacity of the at least one connection,
throughput of the at least one connection,
available bandwidth of the at least one connection,
error rate of the at least one connection, and
access technology type of the at least one connection.

14. The method of claim 1, wherein the request message for specifying the neighbor comprises a media access control (MAC) address associated with the third device.

15. A first device for communicating in a network, the first device comprising:
a network interface;
a processor; and
memory having instructions stored therein which, when executed by the processor, cause the first device to:
transmit, via the network interface of the first device, a request message from the first device to a second device, the request message for specifying a neighbor of the second device, wherein the request message comprises a request for link metric information about at least one connection between the second device and the neighbor, wherein a third device is the neighbor of the second device specified in the request message, and
receive a response message from the second device in response to the request message, the response message including the link metric information.

16. The first device of claim 15, wherein the request message identifies a plurality of connections between the second device and the third device.

17. The first device of claim 15, wherein the link metric information included in the response message comprises interface-specific link metric information about each of a plurality of connections between the second device and the third device.

18. The first device of claim 15, wherein the request message comprises a subscription message that establishes a notification subscription, wherein the subscription message indicates that the notification subscription is associated with requesting at least one member of a group consisting of a triggered notification, periodic notifications, and a combination of triggered and periodic notifications.

19. The first device of claim 18, wherein the triggered notification is received based, at least in part, on a change in the link metric information beyond a threshold amount.

20. The first device of claim 15, wherein the instructions, when executed by the processor, cause the first device to transmit requests to a plurality of devices requesting link metric information about at least one interface at each of the plurality of devices.

21. The first device of claim 15, wherein the instructions, when executed by the processor, cause the first device to:
select a communication path to the third device based, at least in part, on the link metric information.

22. A non-transitory computer-readable media, comprising instructions which, when executed by at least one processor of a first device, cause the first device to:
transmit a request message from the first device to a second device, the request message for specifying a neighbor of the second device, wherein the request message comprises a request for link metric information about at least one connection between the second device and the neighbor, wherein a third device is the neighbor of the second device specified in the request message; and
receive a response message from the second device in response to the request message, the response message received including the link metric information.

23. The non-transitory computer-readable media of claim 22, comprising further instructions which, when executed by the at least one processor of the first device, cause the first device to select, at the first device, one or more of a plurality of connections between the second device and the third device based, at least in part, on the link metric information, and to cause a communication from the first device to the third device via the second device to use the selected one or more of the plurality of connections.

24. The non-transitory computer-readable media of claim 22, wherein the request message comprises a subscription message that establishes a notification subscription, wherein the notification subscription is associated with periodic notification messages, and comprising further instructions which, when executed by the at least one processor of the first device, cause the first device to receive the periodic notification messages according to a time interval.

25. The non-transitory computer-readable media of claim 22, wherein the request message comprises a subscription message that establishes a notification subscription, wherein the notification subscription is associated with a triggered notification based, at least in part, on a change in the link metric information beyond a threshold amount.

26. A method for communicating in a network, the method comprising:
receiving, from a first device by a second device, a request message for specifying a neighbor of the second device, wherein the request message comprises a request for link metric information about at least one connection between the second device and the neighbor, wherein a third device is the neighbor of the second device specified in the request message;
determining, by the second device, the link metric information about the at least one connection; and
transmitting a response message from the second device to the first device in response to the request message, the response message including the link metric information.

27. The method of claim 26, wherein the response message includes the link metric information for a plurality of connections between the second device and the third device.

28. The method of claim 26, wherein the request message comprises a subscription message that establishes a notification subscription, wherein the subscription message indicates that the notification subscription is associated with requesting at least one member of a group consisting of a triggered notification, periodic notifications, and a combination of triggered and periodic notifications.

29. The method of claim 28, further comprising:
   transmitting the periodic notifications according to a time interval.

30. The method of claim 28, further comprising:
   after said determining the link metric information, determining whether the link metric information has changed beyond a threshold amount,
   wherein said transmitting the response message comprises transmitting the triggered notification in response to determining that the link metric information has changed beyond the threshold amount.

31. The method of claim 26, wherein the response message includes the link metric information for a plurality of connections between the second device and the third device.

* * * * *